US 6,473,985 B2

(12) United States Patent
Won et al.

(10) Patent No.: US 6,473,985 B2
(45) Date of Patent: Nov. 5, 2002

(54) REMOTE CENTER COMPLIANCE SYSTEM HAVING VARIABLE CENTER

(75) Inventors: Sang-cheol Won; Sang-cheol Lee, both of Kyungsangbuk-do (KR)

(73) Assignee: Pohang University of Science and Technology Foundation, Pohang (KR)

( * ) Notice: Subject to any disclaimer, the term of this patent is extended or adjusted under 35 U.S.C. 154(b) by 58 days.

(21) Appl. No.: 09/758,378

(22) Filed: Jan. 12, 2001

(65) Prior Publication Data

US 2001/0018804 A1 Sep. 6, 2001

(30) Foreign Application Priority Data

Mar. 3, 2000 (KR) ........................................ 2000-10775

(51) Int. Cl.[7] ................................................ G01B 5/25
(52) U.S. Cl. .............................. 33/644; 33/520; 901/45
(58) Field of Search ........................... 33/644, 520, 613, 33/626, 628, 636, 638, 642, 556, 558, 559, 561; 401/164; 901/45

(56) References Cited

U.S. PATENT DOCUMENTS

| | | | |
|---|---|---|---|
| 4,098,001 A | | 7/1978 | Watson |
| 4,414,750 A | * | 11/1983 | De Fazio ...................... 901/45 |
| 4,477,975 A | * | 10/1984 | De Fazio et al .............. 33/644 |
| 4,627,169 A | * | 12/1986 | Zafred et al. .................. 33/520 |
| 4,848,757 A | * | 7/1989 | De Fazio ...................... 33/644 |
| 4,896,431 A | * | 1/1990 | Danmoto et al. ............. 33/520 |
| 5,396,714 A | * | 3/1995 | Sturges et al. ................ 33/520 |
| 5,836,083 A | | 11/1998 | Sangwan |

FOREIGN PATENT DOCUMENTS

GB            2152473 A   *  8/1985   .................. 33/644

* cited by examiner

*Primary Examiner*—Christopher W. Fulton
(74) *Attorney, Agent, or Firm*—Leydig, Voit & Mayer, Ltd.

(57) ABSTRACT

A remote center compliance system having a variable center, an upper plate, a lower plate, and elastic bodies installed between the upper and lower plates, includes lower rotary plates, each having a rotation axis parallel to a center axis passing the center of the lower plate and the center of the upper plate, coupled to a lower end of each of the elastic bodies and coupled to the lower plate for rotating, and upper rotary plates, each being coupled to an upper end of each of the elastic bodies and concurrently coupled to the upper plate for rotating about the rotation axis of the lower rotary plate. A center axis of each of the elastic bodies is inclined with respect to the rotation axis of the lower rotary plate to which each of the elastic bodies is coupled. Thus, when parts having different lengths are to be assembled, the assembly of the parts can be easily performed only by rotating the rotary plates and the elastic bodies without changing the RCA system to cope with various lengths of the parts. Time and cost of the assembly process can be reduced.

3 Claims, 5 Drawing Sheets

REMOTE CENTER COMPLIANCE SYSTEM HAVING VARIABLE CENTER

BACKGROUND OF THE INVENTION

1. Field of the Invention

The present invention relates to a remote center compliance system used for an assembling apparatus such as a robot, and more particularly, to a remote center compliance system having a variable center which enables various assembly processes without a change of an assembly apparatus by manually or automatically changing the compliance center disposed at the center axis of the assembly apparatus.

2. Description of the Related Art

In general, a remote center compliance system (hereinafter referred to as RCC) enables precision assembly of a circular shaft or pin by correcting a relative positional or angular error between assembled parts generated when an assembly apparatus such as a robot performs various assembly work. The RCC system prevents an assembly apparatus such as a robot from receiving an excessive force so that damage which may occur during an assembly process can be prevented. Thus, the RCC system can improve productivity in manufacturing products.

A conventional RCC system has been disclosed in U.S. Pat. No. 4,098,001. Referring to FIG. 1, the conventional RCC system includes a lower plate 10 connecting a part A to be assembled, an upper plate 20 fixed to an assembly apparatus 1 such as a robot, and a plurality of elastic bodies 30 installed between the upper and lower plates 20 and 10. The system has a special center, i.e., a compliance center Z, disposed at a position spaced a predetermined distance P from a center axis in a coordinate set at the center of the system. When a force is applied in a horizontal direction, the compliance center Z moves only in the horizontal direction without an angular change. Also, when a rotational moment is applied, the compliance center Z rotates only in a direction of the moment without movement in the horizontal direction.

Assuming that the compliance center Z is located at the end portion of the part A fixed to the lower plate 10 of the RCC system, as shown in FIG. 1, when a positional error in the horizontal direction occurs during a process in which the part A is inserted into a hole 5 of a work piece 3, a force in the horizontal direction applies to the compliance center Z due to reaction R at a contact surface. Thus, the part A fixed to the lower plate 10 of the RCC system moves in the horizontal direction and can be inserted into the hole 5, as shown in FIG. 2, so that the assembly process can be smoothly performed at a desired assembly position.

A typical RCC system, however, has a simple structure in which the position of the compliance center Z is fixed. Thus, when parts having various lengths are to be assembled, not only various RCC systems should be used but also the length of a part to be assembly is restricted. That is, when parts having different lengths are to be assembled, an RCC system suitable for the length of each part should be used. Accordingly, replacement of the RCC system during the assembly process is needed.

Consequently, when parts having different lengths are assembled, various RCC systems having compliance centers at difference positions and new equipment replacement of RCC systems of an assembly apparatus such as a robot are required.

SUMMARY OF THE INVENTION

To solve the above problems, it is an object of the present invention to provide a remote center compliance system having a variable center by which the position of compliance center enables replacement of an elastic body of an RCC system.

Accordingly, to achieve the above object, there is provided a remote center compliance system having a variable center having an upper plate and a lower plate, and a plurality of elastic bodies installed between the upper and lower plates, the system comprising a plurality of lower rotary plates, each having a rotation axis parallel to a center axis passing the center of the lower plate and the center of the upper plate, and coupled to a lower end of each of the elastic bodies and coupled to the lower plate to be capable of rotating, and a plurality of upper rotary plates, each being coupled to an upper end of each of the elastic bodies and concurrently coupled to the upper plate to be capable of rotating about the rotation axis of the lower rotary plate, in which a center axis of each of the elastic bodies is inclined with respect to the rotation axis of the lower rotary plate to which each of the elastic bodies is coupled.

It is preferred in the present invention that the system further comprises a lower rotary plate position fixing means for preventing rotation of the lower rotary plates and an upper rotary plate position fixing means for preventing rotation of the upper plates.

Also, it is preferred in the present invention that the lower rotary plate position fixing means comprises a plurality of lower position determination holes formed along the outer circumferential surface of each of the lower rotary plates, and a lower position fixture installed at the lower plate to be capable of advancing or retreating with respect to the outer circumferential surface of each of the lower rotary plates so that the lower position fixture can be inserted in one of the lower position determination holes when the lower position fixture advances to the outer circumferential surface of each of the lower rotary plates, and the upper rotary plate position fixing means comprises a plurality of upper position determination holes formed along the outer circumferential surface of each of the upper rotary plates, and a upper position fixture installed at the upper plate to be capable of advancing or retreating with respect to the outer circumferential surface of each of the upper rotary plates so that the upper position fixture can be inserted in one of the upper position determination holes when the upper position fixture advances to the outer circumferential surface of each of the upper rotary plates.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
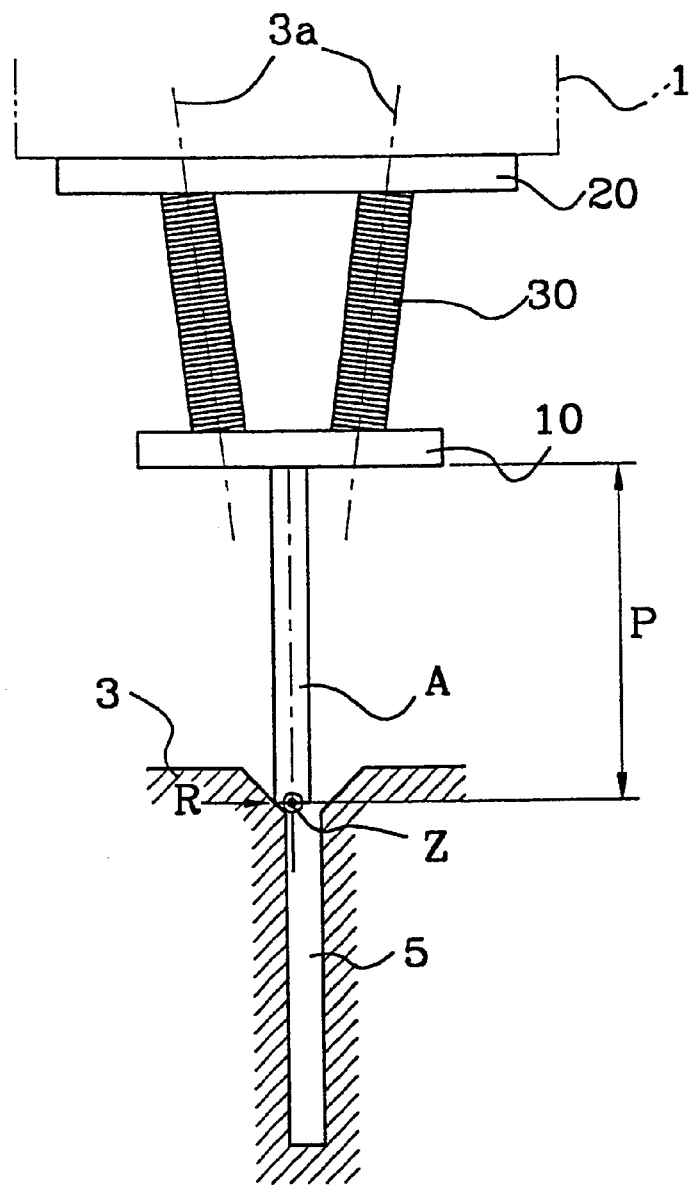
FIG. 1 is a view explaining the case in which a part fixed to a conventional RCC system contacts a work piece.
Figure 2:
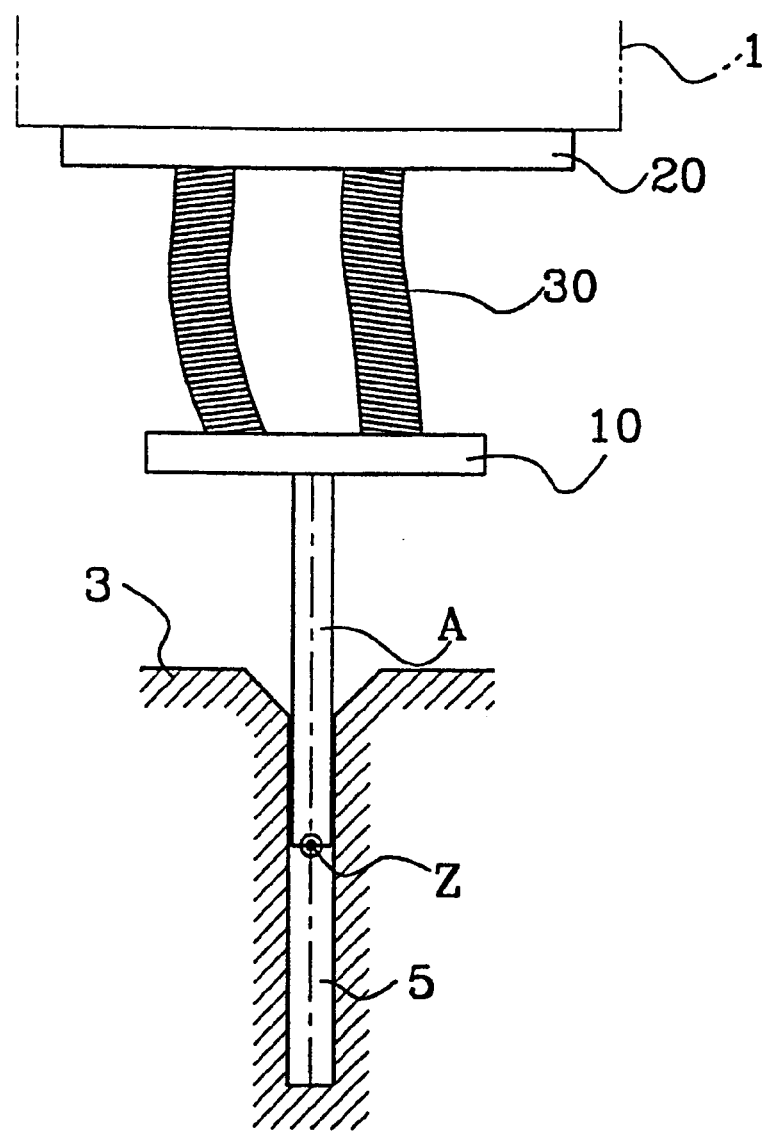
FIG. 2 is a view explaining the case in which the RCC system of FIG. 1 moves in a horizontal direction.
Figure 3:
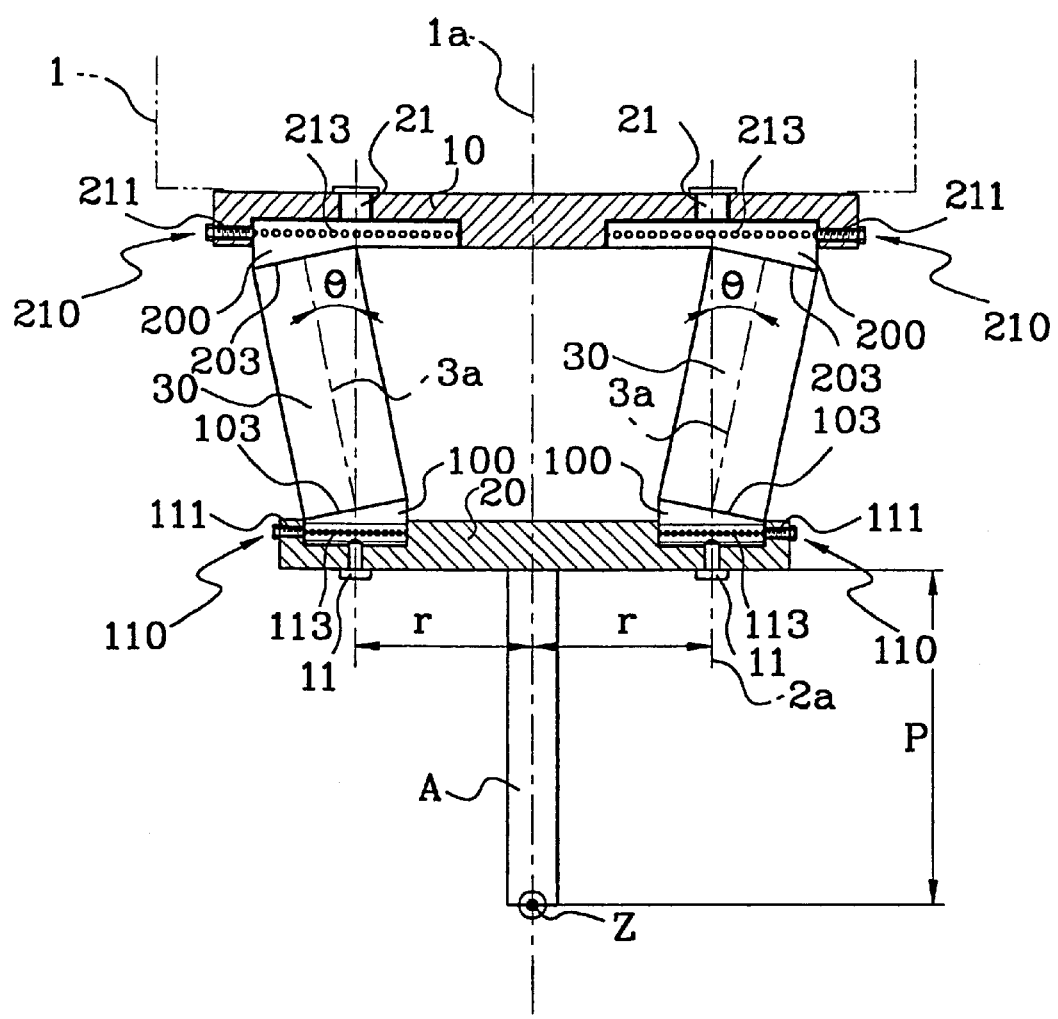
FIG. 3 is a sectional view of an RCC system having a variable center according to a preferred embodiment of the present invention.

Referring to FIG. 3, an RCC system having a variable center according to a preferred embodiment of the present invention includes a lower plate 10, an upper plate 20, and a plurality of elastic bodies 30 coupling the lower and upper plates 10 and 20. The upper plate 20 is installed at an assembly apparatus 1 such as a robot, and a part A to be assembled is coupled to the lower plate 10.

The same number of upper rotary plates 200 as the elastic bodies 30 are installed at the bottom surface of the upper plate 20. The upper rotary plates 200 are respectively coupled to the upper surfaces of the elastic bodies 30. The same number of lower rotary plates 100 as the elastic bodies 30 are installed at the upper surface of the lower plate 10. The lower rotary plates 200 are respectively coupled to the lower surfaces of the elastic bodies 30.

Also, the lower and upper rotary plates 100 and 200 are rotatably coupled to lower connection pins 11 and upper connection pins 21, respectively, so that the rotary plates 100 and 200 can rotate integrally with the elastic bodies 30 about rotation axes $2a$ parallel to a central axis $1a$ passing the centers of the lower plate 10 and the upper plate 20.

Also, each of the elastic bodies 30 is fixed between the lower and upper rotary plates 100 and 200 and inclined at a predetermined angle $\theta$ between a center axis $3a$ of each of elastic bodies 30 and the rotation axis $2a$ of each of the rotary plates 100 and 200. The angle $\theta$ is referred to as a focus angle.

Thus, each of the elastic bodies 30 is coupled to each of the lower rotary plates 100 such that the center of a lower end of each of the elastic bodies 30 matches the center of each of the lower rotary plates 100 on the rotation axis $2a$. In contrast, the upper end of each of the elastic bodies 30 is coupled to each of the upper rotary plates 200 and capable of rotating about the rotation axis $2a$ at a position separated by a predetermined distance from the rotation axis $2a$.

The coupling surfaces 103 and 203 of the lower and upper rotary plates 100 and 200 to which the elastic bodies 30 are coupled, are preferably perpendicular to each center axis $3a$. In this case, the coupling surfaces 103 and 203 are inclined by the focus angle $\theta$ with respect to the horizontal surfaces of the lower and upper plates 10 and 20.

The elastic bodies 30 of the RCC system having a variable center according to a preferred embodiment of the present invention may be rubber only, or of multiple rubber and a steel material.

The lower and upper plates 10 and 20 are capable of fixing each of the positions of the lower and upper rotary plates 100 and 200 by a lower rotary plate position fixing means 110 and an upper rotary plate position fixing means 210.

The lower rotary plate position fixing means 110 according to a preferred embodiment of the present invention includes a plurality of lower position determination holes 113 along the circumferential surface of each of the lower rotary plates 100 and a lower position fixture 111 screw-coupled to each of the lower rotary plates 100 and capable of being inserted in one of the lower position determination holes 113. Likewise, the upper rotary plate position fixing means 210 includes a plurality of upper position determination holes 213 along the circumferential surface of each of the upper rotary plates 200 and an upper position fixture 211 screw-coupled to each of the upper rotary plates 200 capable of being inserted in one of the upper position determination holes 213.

Figure 4:
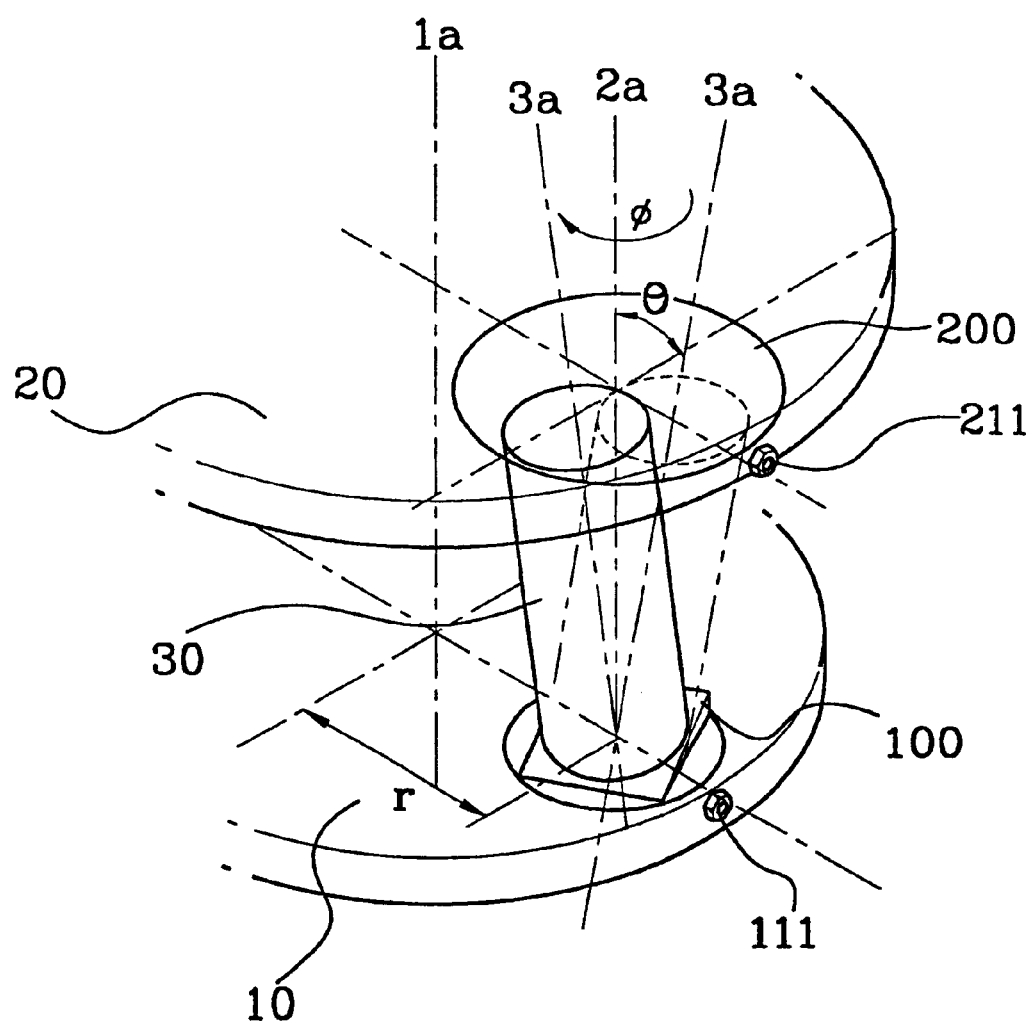
FIG. 4 is a perspective view schematically showing the positions of a rotational plate and the elastic body when a single elastic body rotates in the RCC system having a variable center of FIG. 3.

The operation of the RCC system having the above structure according to a preferred embodiment of the present invention will be described with reference to FIG. 4. FIG. 4 schematically shows the position of one of the elastic bodies 30 when a pair of rotary plates 100 and 200 rotate by a predetermined rotation angle $\phi$.

To assemble parts having different lengths during an assembly process, the position of the compliance center Z of the RCC system needs to be changed. Here, in the present embodiment, the position of the compliance center Z can be changed by adjusting the rotation angle $\phi$ of the elastic bodies 30.

That is, as shown in the drawing, in order to rotate one of the elastic bodies 30 fixed at the position indicated by a dotted line by a predetermined angle $\phi$, the lower position fixture 111 and the upper position fixture 211 fixed at the lower plate 10 and the upper plate 20, respectively, are screw-rotated to retreat from the circumferential surface of each of the rotary plates 100 and 200. Then, the position fixtures 111 and 211 are separated from the position fixing holes 113 and 213 (refer to FIG. 3) of the lower rotary plate 100 and the upper rotary plate 200, respectively, to which the position fixtures 111 and 211 are coupled. Accordingly, each of the rotary plates 100 and 200 is in a state of being able to rotate. Then, a pair of the rotary plates 100 and 200 are rotated by a predetermined angle $\phi$. In this state, the position fixtures 111 and 211 are advanced toward the centers of the respective rotary plates 100 and 200, respectively, so that each of the position fixtures 111 and 211 can be inserted in one of the lower and upper position determination holes 113 and 213, thus fixing the rotary plates 100 and 200. By doing so, the elastic bodies 30 can be prevented from being rotated by vibrations generated during the assembly process.

In the RCC having a variable center according to a preferred embodiment of the present invention, the relationship between the rotation angle $\phi$ of each of the elastic bodies 30 and the position P of the compliance center Z is as follows.

In a typical RCC system, the position P of the compliance center Z is determined by factors such as distance between the center of the lower plate 10 and the center axis $3a$ of each of the elastic bodies 30, the focus angle $\theta$, and a physical property, for example, an elastic coefficient of the elastic bodies 30. In addition, the rotation angle $\phi$ of the elastic bodies 30 functions as an additional factor in the adjustment of the position P of the compliance center Z in the RCC system according to a preferred embodiment of the present invention.

That is, since the elastic bodies 30 are positioned by being rotated by a predetermined angle $\phi$ and inclined by the focus angle $\phi$, stress applied from the outside to each of the elastic bodies 30 changes so that the position P of the compliance center Z is changed.

Thus, in the RCC system having a variable center according to a preferred embodiment of the present invention, by adjusting only the rotation angle $\phi$ P of the elastic bodies 30 in the state in which the distance r and the focus angle $\theta$ are fixed, the position P of the compliance center Z is changed. That is, according to the present invention, since the distance r and the focus angle $\theta$ do not need to be changed, the position P of the compliance center Z can be changed without change in rigidity of the elastic bodies 30 in a horizontal direction.

Figure 5:
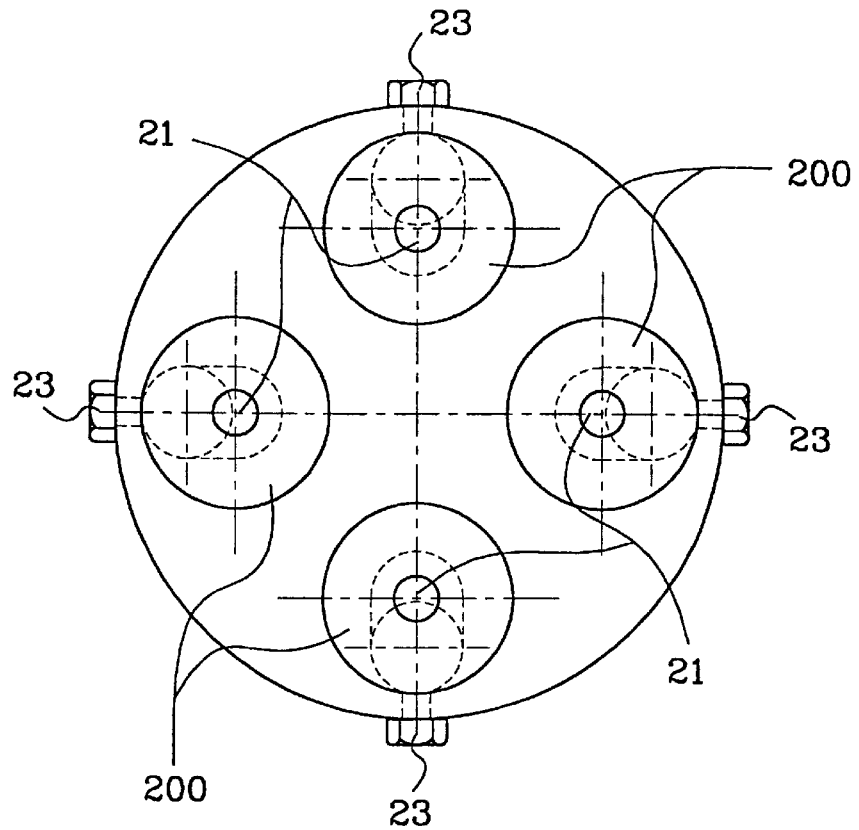
FIG. 5 is a plan view of an RCC system having a variable center according to another preferred embodiment of the present invention.
Figure 6:
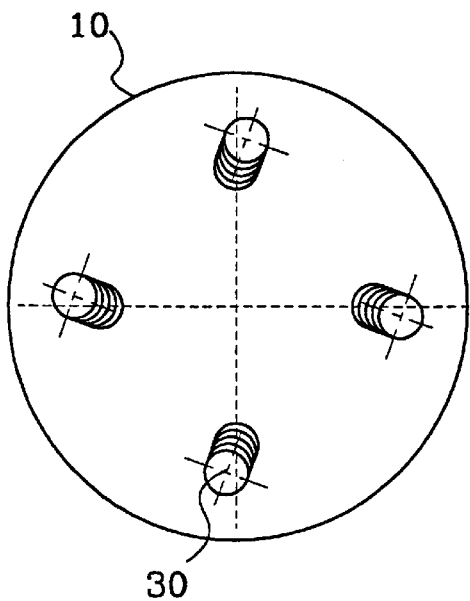
FIG. 6 is a plan view showing the state in which all elastic bodies of the RCC system having a variable center shown in FIG. 5 are rotated at the same angle.

FIG. 5 shows an RCC system having a variable center having four elastic bodies 30 according to another preferred embodiment of the present invention. FIG. 6 shows the RCC system of FIG. 5, in which each of the elastic bodies 30 is rotated by a predetermined angle. Of course, each of the elastic bodies 30 installed at the RCC system having a variable center can rotate by different angles, if necessary.

When an external force in the same condition as shown in FIGS. 5 and 6 is applied to each of the elastic bodies 30, in the state as shown in FIG. 6 in which the elastic bodies 30 are rotated, it can be seen that the position of the compliance center changes due to a change of stress applied to each of the elastic bodies 30.

Since the structure and operation of the RCC system having a variable center according to another preferred embodiment of the present invention are the substantially same as those of the system described with reference to FIGS. 3 and 4, the same reference numerals are used for the same elements and the detailed description thereof will be omitted.

As described above, in the RCC system having a variable center according to the present invention, since the elastic body is rotatably coupled between the upper and lower rotary plates and inclined by a predetermined angle, the position of the compliance center can be easily changed as the rotary plates and the elastic bodies rotate. Thus, when parts having different lengths are to be assembled, assembly of the parts can be easily performed only by rotating the rotary plates and the elastic bodies by a predetermined angle without changing the RCC system to cope with various lengths of the parts. That is, the time and cost for the assembly process can be reduced.

What is claimed is:

1. A remote center compliance system having:
   a variable center,
   an upper plate;
   a lower plate;
   a plurality of elastic bodies between the upper and lower plates;
   a plurality of lower rotary plates, each lower rotary plate having a rotation axis parallel to a center axis passing through centers of the lower and upper plates, coupled to a lower end of each of the elastic bodies, and coupled to the lower plate for rotating; and
   a plurality of upper rotary plates, each upper rotary plate being coupled to an upper end of each of the elastic bodies and concurrently coupled to the upper plate for rotating about the rotation axis of the lower rotary plate, wherein a center axis of each of the elastic bodies is inclined with respect to the rotation axis of the lower rotary plate to which each of the elastic bodies is coupled.

2. The system as claimed in claim 1, further comprising lower rotary plate position fixing means for preventing rotation of the lower rotary plates and upper rotary plate position fixing means for preventing rotation of the upper plates.

3. The system as claimed in claim 2, wherein
   the lower rotary plate position fixing means comprises:
      a plurality of lower position determination holes along an outer circumferential surface of each of the lower rotary plates; and
      a lower position fixture installed at the lower plate for advancing and retreating with respect to the outer circumferential surface of each of the lower rotary plates so that the lower position fixture can be inserted in one of the lower position determination holes when the lower position fixture advances to the outer circumferential surface of each of the lower rotary plates, and
   the upper rotary plate position fixing means comprises:
      a plurality of upper position determination holes along an outer circumferential surface of each of the upper rotary plates; and
      an upper position fixture installed at the upper plate for advancing and retreating with respect to the outer circumferential surface of each of the upper rotary plates so that the upper position fixture can be inserted in one of the upper position determination holes when the upper position fixture advances to the outer circumferential surface of each of the upper rotary plates.

* * * * *